United States Patent
Monvoisin et al.

(10) Patent No.: US 10,464,688 B2
(45) Date of Patent: Nov. 5, 2019

(54) METHOD FOR GRAPHIC REPRESENTATION OF THE RELATIVE POSITION OF THE SKY AND THE EARTH IN AN ONBOARD DISPLAY SYSTEM FOR AIRCRAFT

(71) Applicant: THALES, Courbevoie (FR)

(72) Inventors: Emmanuel Monvoisin, Bordeaux (FR); Pierre Mariani, Saint Medard en Jalles (FR); Norbert Frestel, Saint Medard en Jalles (FR); Johanna Lux, Le Haillan (FR)

(73) Assignee: THALES, Courbevoie (FR)

( * ) Notice: Subject to any disclaimer, the term of this patent is extended or adjusted under 35 U.S.C. 154(b) by 80 days.

(21) Appl. No.: 15/394,777

(22) Filed: Dec. 29, 2016

(65) Prior Publication Data

US 2017/0183103 A1 Jun. 29, 2017

(30) Foreign Application Priority Data

Dec. 29, 2015 (FR) ...................................... 15 02717

(51) Int. Cl.
*B64D 43/00* (2006.01)
*G01C 21/00* (2006.01)
(Continued)

(52) U.S. Cl.
CPC ............ *B64D 43/00* (2013.01); *G01C 21/00* (2013.01); *G01C 23/00* (2013.01); *G06T 17/05* (2013.01);
(Continued)

(58) Field of Classification Search
CPC ...... G08G 5/0021; G08G 5/025; B64D 43/00; B64D 45/08; G06T 15/00; G06T 15/20;
(Continued)

(56) References Cited

U.S. PATENT DOCUMENTS 6,028,536 A * 2/2000 Voulgaris ............. G01C 23/005
340/973
6,567,014 B1 * 5/2003 Hansen ................... G01C 23/00
340/974

(Continued)

FOREIGN PATENT DOCUMENTS

EP 2 679 961 A2 1/2014

OTHER PUBLICATIONS

Murdock, Circular-Based Arches—Part 1: One-Centered and Two-Centered Arches (Year: 2012).*
(Continued)

*Primary Examiner* — Mark K Zimmerman
*Assistant Examiner* — Phuc N Doan
(74) *Attorney, Agent, or Firm* — Womble Bond Dickinson (US) LLP

(57) ABSTRACT

The general field of the invention is that of the methods for graphic representation of the relative position of the sky and of the earth in an onboard display system for aircraft, said graphic representation being displayed on a display screen comprising piloting and navigation information superimposed on a three-dimensional synthetic representation of the outside landscape. Said graphic representation is displayed only when the attitude of the aircraft is unusual, an unusual attitude corresponding to a roll value or to a pitch value located outside of a first range of nominal values. It comprises two disc segments of identical form, that are opaque and of different colour, situated symmetrically on a circle concentric to that bearing the roll scale, the straight-line segments of the two disc segments being parallel to the line representing the zero longitudinal trim indicator, the rotation of the two disc segments being slaved to the rotation of said zero longitudinal trim indicator.

12 Claims, 6 Drawing Sheets

(51) Int. Cl.
*G06T 17/05* (2011.01)
*G06T 19/00* (2011.01)
*G01C 23/00* (2006.01)

(52) U.S. Cl.
CPC ........ *G06T 19/006* (2013.01); *G06T 2200/04* (2013.01); *G06T 2215/16* (2013.01)

(58) Field of Classification Search
CPC ....... G06T 15/50; G06T 19/006; G06T 19/20; G06T 2200/04; G06T 2215/16; G06T 2219/2016; G06T 2219/2204; G01C 23/00; G02B 2027/0183; G02B 2027/014; G02B 27/0101; G09G 2340/0464; G09G 2380/12; G09G 5/38
See application file for complete search history.

(56) References Cited

U.S. PATENT DOCUMENTS

| | | | | |
|---|---|---|---|---|
| 7,724,155 | B1* | 5/2010 | Anderson | G01C 23/00 340/945 |
| 8,767,013 | B2 | 7/2014 | Jain et al. | |
| 9,221,552 | B2* | 12/2015 | Conner | G01C 23/005 |
| 9,387,938 | B1* | 7/2016 | Vanderkamp | B64D 45/00 |
| 9,540,116 | B1* | 1/2017 | Barber | B64D 43/00 |
| 2007/0182589 | A1* | 8/2007 | Tran | G01C 23/00 340/961 |
| 2010/0141482 | A1 | 6/2010 | Wyatt et al. | |
| 2010/0250030 | A1* | 9/2010 | Nichols | G01C 23/005 701/7 |
| 2012/0078445 | A1* | 3/2012 | Krupansky | G01C 23/00 701/3 |
| 2014/0218216 | A1* | 8/2014 | Conner | G01C 23/005 340/967 |
| 2014/0354456 | A1* | 12/2014 | Gannon | G08G 5/0047 340/972 |
| 2015/0298821 | A1* | 10/2015 | Ishihara | G05D 1/0676 701/18 |
| 2015/0362332 | A1* | 12/2015 | Vernaleken | G01C 23/00 701/4 |
| 2016/0340054 | A1* | 11/2016 | Andre | B64D 43/00 |
| 2016/0371064 | A1* | 12/2016 | Rougerie | G01S 19/07 |
| 2017/0162127 | A1* | 6/2017 | Park | G09G 3/3291 |
| 2019/0056901 | A1* | 2/2019 | He | B64D 43/00 |

OTHER PUBLICATIONS

French Search Report for corresponding French Patent Application No. 1502717, 7 pp., (dated Oct. 28, 2016).

* cited by examiner

METHOD FOR GRAPHIC REPRESENTATION OF THE RELATIVE POSITION OF THE SKY AND THE EARTH IN AN ONBOARD DISPLAY SYSTEM FOR AIRCRAFT

FIELD

The field of the invention is that of the human-system interfaces for aeronautical applications, and more particularly that of the display systems comprising a piloting and navigation assistance symbology coupled with a synthetic representation of the outside landscape.

BACKGROUND

The modern aircraft instrument panels have a display system comprising several display devices. One or more display devices display the information necessary to the piloting or navigation. The information displayed originates from the sensors of the aircraft, from a geolocation system of the "GPS" (Global Positioning System) type and from the inertial system of the aircraft. The measurement system as a whole supplies at least the following parameters: position of the aircraft in latitude, longitude and altitude and orientation of the aircraft in pitch, roll and heading. These display screens are known as "Primary Flight Display", with the acronym "PFD".

Generally, these screens also comprise a synthetic representation of the outside landscape. This representation is derived from a system called "SVS", the acronym for "Synthetic Vision System". An SVS system comprises a mapping database representative of the terrain flown over, a geolocation system and graphic computation means. The image displayed is a three-dimensional view of the outside represented as realistically as possible. The viewpoint displayed is in the axis of the aircraft. These screens can also display, instead of the SVS, a real image of the outside landscape, derived from a system called "EVS", the acronym for "Enhanced Vision System", or display this real image superimposed on the synthetic view of the outside landscape, which is then called "CVS", the acronym for "Combined Vision System".

When a PFD screen comprises a synthetic image of the landscape, a large quantity of information is represented and it is essential, when an abnormal situation occurs, for the pilot to be aware of it as quickly as possible. That happens notably when the carrier is in an unusual attitude, for example when the roll or the pitch of the aircraft are too high. The unusual attitude situation may occur for various reasons such as, for example, the loss of outside visual references in bad weather or the inattention of the pilot subject to an excessive workload or searching for a reference on the ground. This unusual attitude position can, in addition, be aggravated if there is a deviation between the visual and sensory perceptions of the pilot and the instrument indications. This deviation may originate from a failure on the instrument indications or from a bad interpretation of the physical sensations of the pilot.

To assist the pilot in coming out of an unusual attitude, the display on the PFD is of great importance. It must allow the pilot to easily find his or her bearings, notably the orientation of the aeroplane relative to the sky and to the earth. This is all the more obvious when the synthetic image displays only the terrain, a situation called "brown-over-brown", or only the sky, a situation called "blue-over-blue", or even a portion of sky and a portion of sea, both represented in blue, even if the blues are substantially different.

To assist the pilot in knowing where the sky and the earth are located in unusual attitudes, it is common practice to have a permanent display of two circular arcs 10 and 11, a blue arc on the sky side and a brown arc on the earth side, as shown in FIG. 1 which schematically represents a PFD screen. For clarity, in this figure, the image of the terrain is symbolized by a simple crest line 12 and the symbology is highly simplified. This representation has a number of drawbacks. In nominal mode, these circular arcs are useless and therefore overload the display. In degraded mode corresponding to the unusual attitudes, they are not sufficiently visible and therefore do not provide the necessary assistance to the pilot.

To overcome these drawbacks, other solutions have been proposed. Thus, the U.S. Pat. No. 7,724,155 entitled "Graphical methods for enhancing attitude awareness" proposes various graphic solutions making it possible to indicate the sky/earth separation. In a first configuration, the sky/earth information is at the periphery of the display area and is not therefore in the primary area where the gaze of the pilot is focused. It may then be that the pilot does not pay sufficient attention to this information. Furthermore, in case of unusual attitude, only a small portion corresponding to the sky or to the earth is visible, because the separation of the two portions is determined by the position of the line representing the zero longitudinal trim indicator, also called "ZPRL", the acronym for "Zero Pitch Reference Line". The pilot needs more time to assimilate the information and comprehend the orientation of the aeroplane. In a second configuration, the sky/earth information is on either side of the ZPRL. It is well inside the primary area where the gaze of the pilot is focused but the information strip is thin, so the two items of information are very close together, and it is then possible for the pilot not to sufficiently well distinguish between what is above and what is below the ZPRL. Furthermore, in conditions where the position of the ZPRL is at the edge of the screen, the sky/earth information is no longer in the primary area where the gaze of the pilot is focused. Here again, it is possible for the pilot not to pay sufficient attention to this information.

The application US 2010/0141482 entitled "System and method for rendering a primary flight display" proposes solutions similar to those described above and has the same drawbacks.

The U.S. Pat. No. 8,767,013 entitled "System and method for rendering a sky veil on a vehicle display" describes a display where the sky is presented in semi-transparency to avoid the so-called "brown-over-brown" situations. However, when the position of the ZPRL is at the edge of the screen, only a small portion corresponding to the sky or to the earth is visible, and the pilot needs longer to assimilate the information and comprehend the orientation of the aeroplane. Furthermore, the colour of the transparent sky is identical to the colour of the synthetic sky, making it impossible to distinguish the transparent sky from the synthetic sky and therefore making the information more unclear.

SUMMARY

The method according to the invention does not have these drawbacks. In effect, the earth/sky display is not presented constantly but only when the situation demands it. Moreover, its representation changes as a function of the criticality of the situation. More specifically, the subject of the invention is a method for graphic representation of the relative position of the sky and of the earth in an onboard display system for aircraft, said graphic representation being displayed on a display screen comprising the piloting and navigation information for said aircraft superimposed on a three-dimensional synthetic representation of the outside landscape or on a real image of the outside landscape, characterized in that said graphic representation is displayed only when the attitude of the aircraft is unusual, an unusual attitude corresponding to a roll value or to a pitch value located outside of a first range of nominal values.

Advantageously, the graphic representation comprises at least two different representation modes, the first representation mode corresponding to roll or pitch values located outside of a first range of nominal values, the second representation mode corresponding to roll or pitch values located outside of a second range of values, higher than the first range of nominal values.

Advantageously, the first representation mode comprises two identical elongate forms, that are opaque and of different colour, situated symmetrically on a circle concentric with the circle bearing the roll scale, the rotation of the two forms being slaved to the rotation of the line representing the zero longitudinal trim indicator.

Advantageously, the first representation mode comprises two disc segments of identical form, that are opaque and of different colour, each disc segment being limited by a circular arc and a straight-line segment joining the ends of said circular arc, the two disc segments being situated symmetrically on a circle bearing a roll scale, the straight-line segments of the two disc segments being parallel to the line representing the zero longitudinal trim indicator, the rotation of two disc segments being slaved to the rotation of said line representing the zero longitudinal trim indicator.

Advantageously, the width of the disc segment lies between 15% and 25% of the length of the straight-line segment.

Advantageously, the second representation mode comprises the two preceding disc segments and two areas of identical form that are semi-transparent and of different colours, the two areas being situated symmetrically on the circle bearing the roll scale, the first area extending between the straight-line segment of the first disc segment and the line representing the zero longitudinal trim indicator, without ever leaving the area defined by the straight-line segments of the first and of the second disc segments, the second area extending between the straight-line segment of the second disc segment and the line representing the zero longitudinal trim indicator, without ever leaving the area defined by the straight-line segments of the first and of the second disc segments.

Advantageously, when the roll value is located outside of a third range of values, lower than the first range of nominal values, the roll scale is widened, continually or discretely, so as to increase with the roll value.

Advantageously, the first range of roll values lies between −45 degrees and +45 degrees, the second range of roll values lies between −50 degrees and +50 degrees, the first range of pitch values lies between −12.5 degrees and +15 degrees, the second range of pitch values lies between −25 degrees and +25 degrees.

Advantageously, the display device comprises a function making it possible to avoid untimely changes of mode.

Advantageously, the display device comprises a real image of the outside landscape superimposed on the synthetic view of the outside landscape.

Advantageously, the display device is one of the aircraft instrument panel screens.

Advantageously, the display device is a so-called "head up" display device comprising an optical element superimposing the synthetic image and/or the real image on the outside landscape.

BRIEF DESCRIPTION OF THE DRAWINGS

The invention will be better understood and other advantages will become apparent on reading the following description given in a nonlimiting manner and from the attaching figures in which.

DETAILED DESRIPTION

The method according to the invention is implemented in an aircraft onboard avionics system. This system comprises at least sensors making it possible to determine the attitude of the aircraft, its altitude and, more generally, all of the parameters necessary to the piloting and the navigation. This avionics system also comprises an SVS system comprising a mapping database representative of the terrain flown over and/or an EVS system notably comprising infrared sensors, a geolocation system and graphic computation means. The image displayed is a three-dimensional view of the outside represented as realistically as possible or a real image of the outside landscape deriving from the EVS sensors. The viewpoint displayed is in an axis lying between the heading and the direction of flight of the aircraft. All of this information is displayed on at least one of the aircraft instrument panel screens. This screen is conventionally called PFD. This PFD screen therefore comprises a large quantity of information.

Also, in the method according to the invention, the information making it possible to perfectly determine the position of the aircraft relative to the horizon is not displayed permanently but only in critical situation cases. Hereinafter in the description, this sky-earth information is called "ADI", the acronym for "Attitude Directional Indicator". This solution presents the dual advantage of not overloading the display when the flight parameters are nominal and, conversely, of having a display that is clearly apparent when the aircraft is in an unusual situation. An unusual situation should be understood to be an attitude of the aircraft corresponding to a roll value or to a pitch value located outside of a first range of nominal values. To give orders of magnitude, a situation is deemed unusual if the roll is outside of a first range lying between −45 degrees and +45 degrees and/or the pitch is outside of a first range of values lying between −12.5 degrees and +15 degrees. These values depend on the type of aircraft and on the flight conditions imposed by the aircraft constructor.

This sky-earth information can be displayed in different ways. One advantageous solution is to display forms or symbols recalling the form of the "horizon" which basically indicates the attitude. These forms or symbols can be disc portions, circular arcs, "beams", rectangles, or any other elongate geometrical form. These two forms may be different depending on whether one represents the sky and the other the earth, and they have two textures that are sufficiently different not to be confused. That may be, in a non-exhaustive manner, two different colours or two different fill patterns, with a configurable level of transparency.

Figure 1:
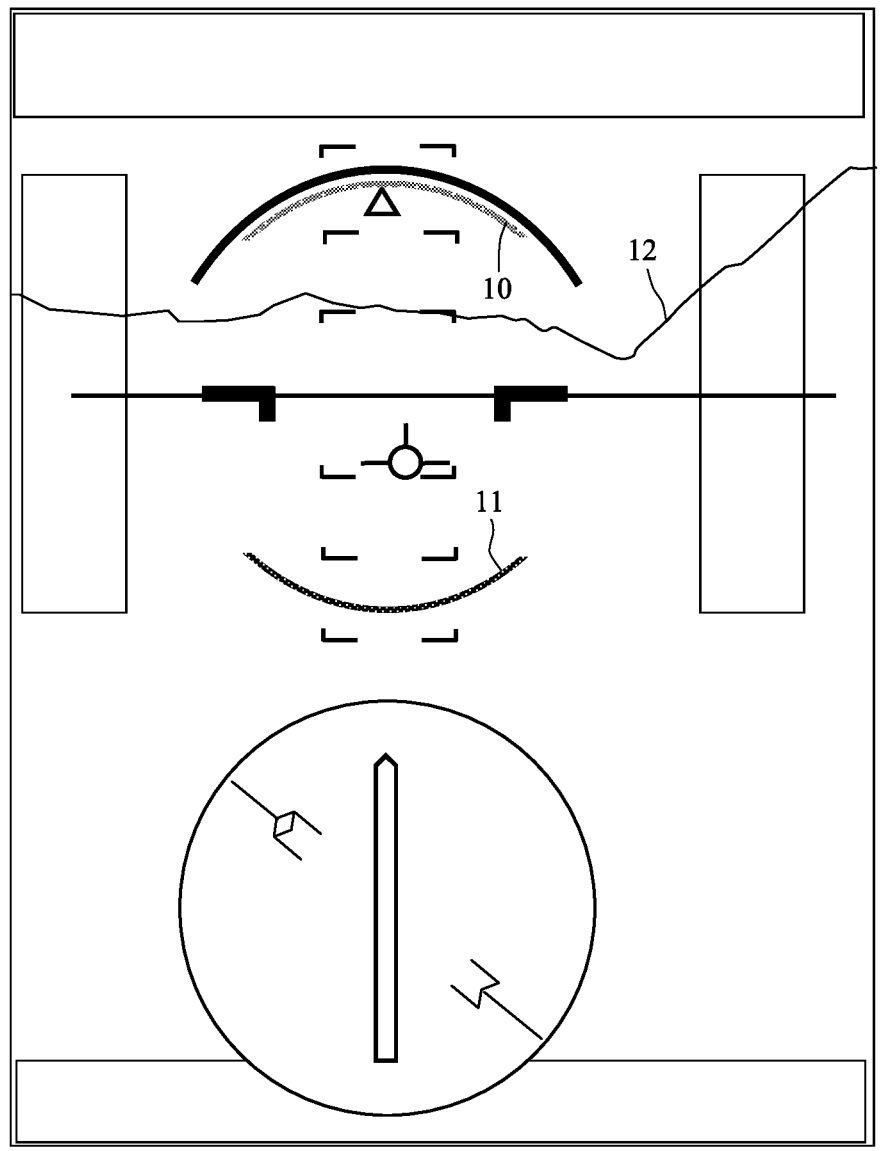
FIG. 1 represents a PFD screen according to the prior art.
Figure 2:
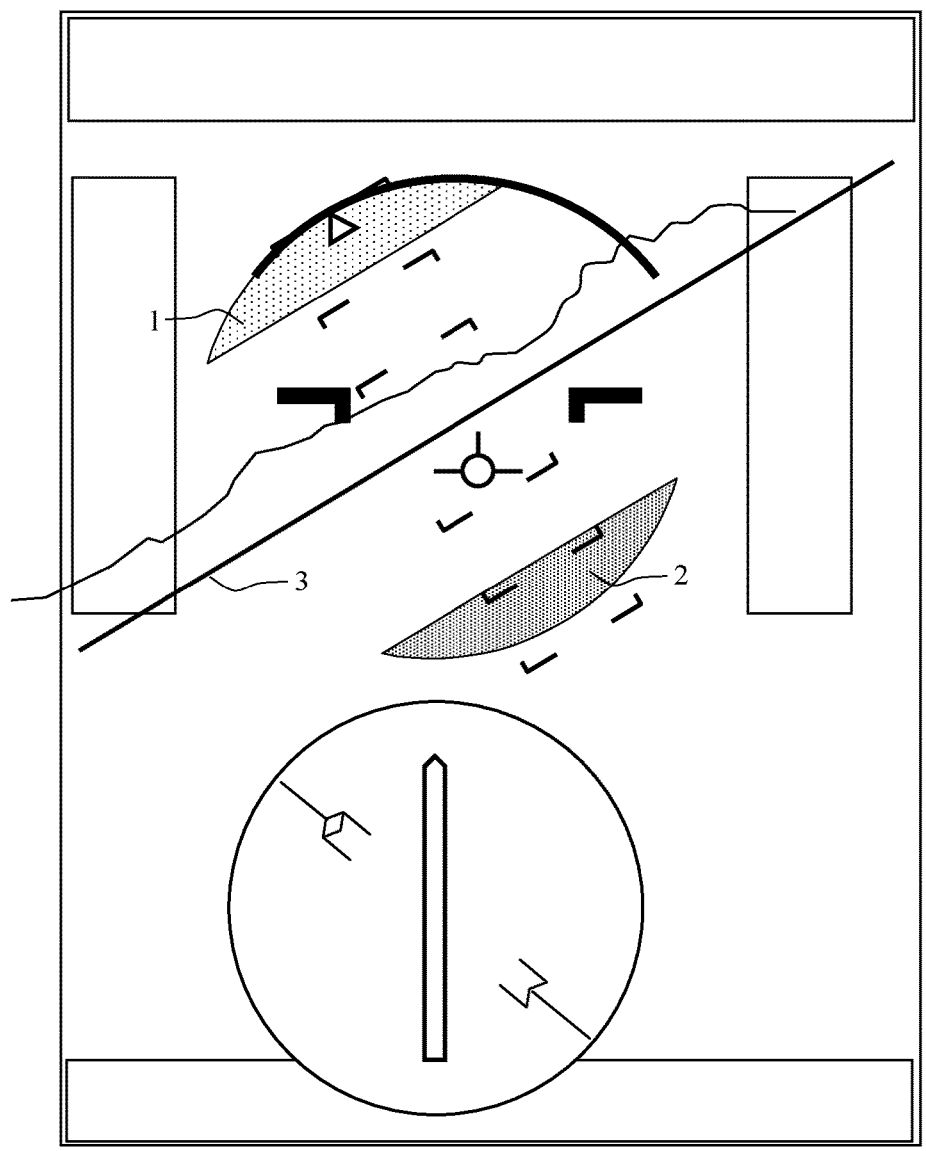
FIG. 2 represents a first representation of a PFD screen according to the invention.

In the preferred solution, the sky-earth information is composed, as can be seen in FIG. 2, of two disc segments of identical form 1 and 2, that are opaque and of different colours, each disc segment being limited by a circular arc and a straight-line segment joining the ends of said circular arc. The two disc segments are situated symmetrically on a circle concentric with the circle bearing the roll scale, the straight-line segments of the two disc segments being parallel to the line representing the zero longitudinal trim indicator, the indicator called ZPRL and denoted 3 in FIG. 2.

Generally, the disc segment representing the sky is coloured blue and the disc segment representing the earth is coloured brown. The width of the disc segments lies between 15% and 25% of the length of the straight-line segments. It is preferable for the colour of the disc portion representing the sky to be different from the colour of the synthetic sky deriving from the SVS representation so that the ADI sky can be distinguished from the synthetic sky. This presentation is easier to perceive than if the two colours are identical, because it makes it possible to clearly see, by virtue of the appearance of the information from a certain threshold, that the carrier is in an unusual attitude.

Figure 3:
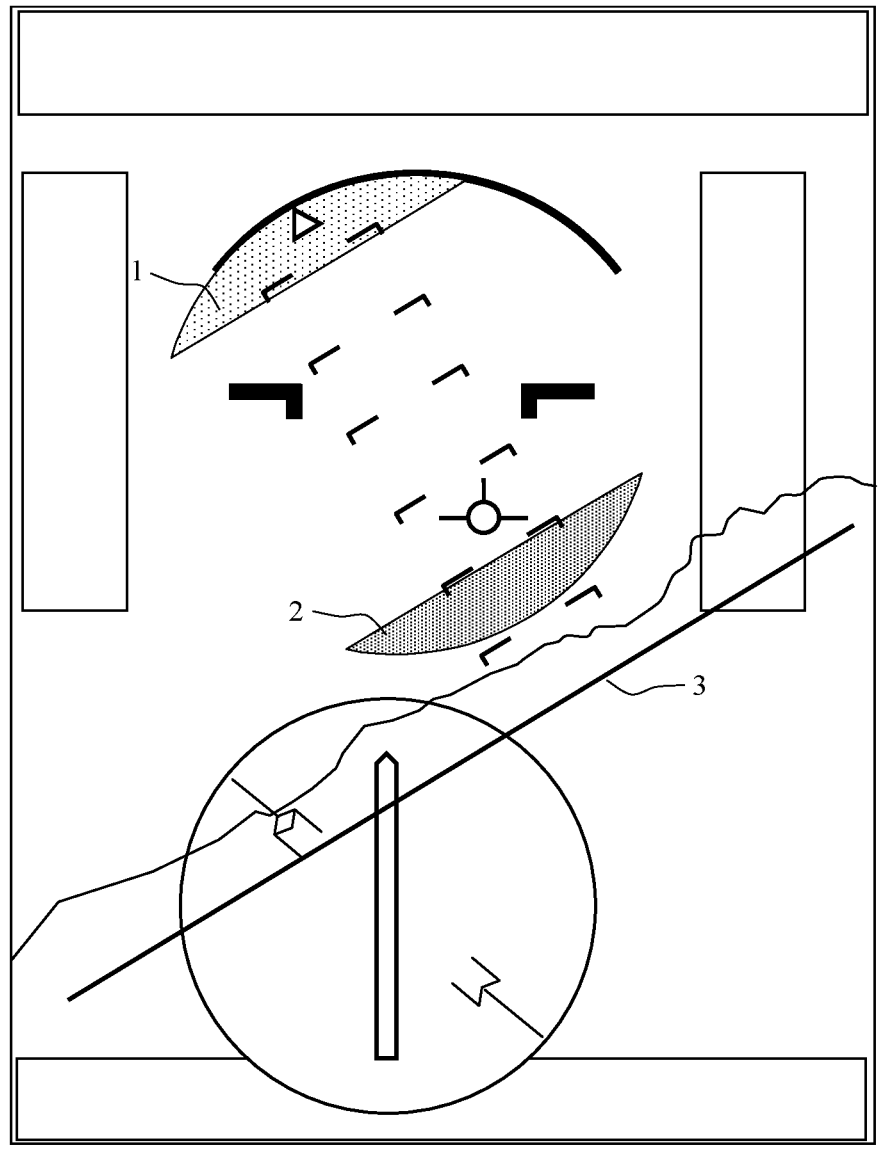
FIG. 3 represents a second representation of a PFD screen according to the invention.

The rotation of the two disc segments is slaved to the rotation of the line representing the zero longitudinal trim indicator. In the case where the ZPRL runs through the middle of the area defined by the two disc portion positions, the portion corresponding to the sky is superimposed on the sky of the synthetic view and on a part of the terrain which is located above the ZPRL and the portion corresponding to the earth is superimposed on the terrain of the synthetic view. However, the two segments turn within a circle whose position is constant, so as to remain constantly within the central visual field of the pilot regardless of the position of the ZPRL. Thus, as can be seen in FIG. 3, in conditions where the position of the ZPRL is at the edge of the screen, the two disc portions remain well within the primary area where the gaze of the pilot is focused.

Another advantage is that this solution also makes it possible to known where the sky and the earth are located in cases of simple "brown-over-brown" and "blue-over-blue" conditions. For that, it is sufficient to define the corresponding conditions for triggering the display of the degraded ADI mode.

It is possible to add an intermediate degraded mode before the appearance of the sky-earth sectors. This mode appears in strong roll cases and causes a progressive or discrete widening of the roll scale. The roll thresholds defining this intermediate mode are lower than the preceding thresholds.

Above a second roll or pitch range of the aircraft, a second representation mode appears. It comprises the two preceding sky/earth sectors and two sky/earth areas lying between the two sky/earth sectors, separated by the line representing the zero longitudinal trim indicator. These two forms may be different depending on whether one represents the sky and the other the earth and they have two textures that are sufficiently different not to be confused. That may be, in a non-exhaustive manner, two different colours or two different fill patterns, with a configurable level of transparency that can range up to total opacity. This transparency parameter can notably allow for a progressive display of the ADI, above the second roll or pitch range of the aircraft.

In a preferred solution, the two forms appearing in the second representation mode are similar forms that are semi-transparent and of different colours, the two areas being situated symmetrically relative to the line representing the zero longitudinal trim indicator on a circle concentric to that bearing the roll scale, the first area extending between the straight-line segment of the first disc segment and the line representing the zero longitudinal trim indicator, without ever leaving the area defined by the straight-line segments of the first and of the second disc segments, the second area extending between the straight-line segment of the second disc segment and the line representing the zero longitudinal trim indicator, without ever leaving the area defined by the straight-line segments of the first and of the second disc segments.

Figure 4:
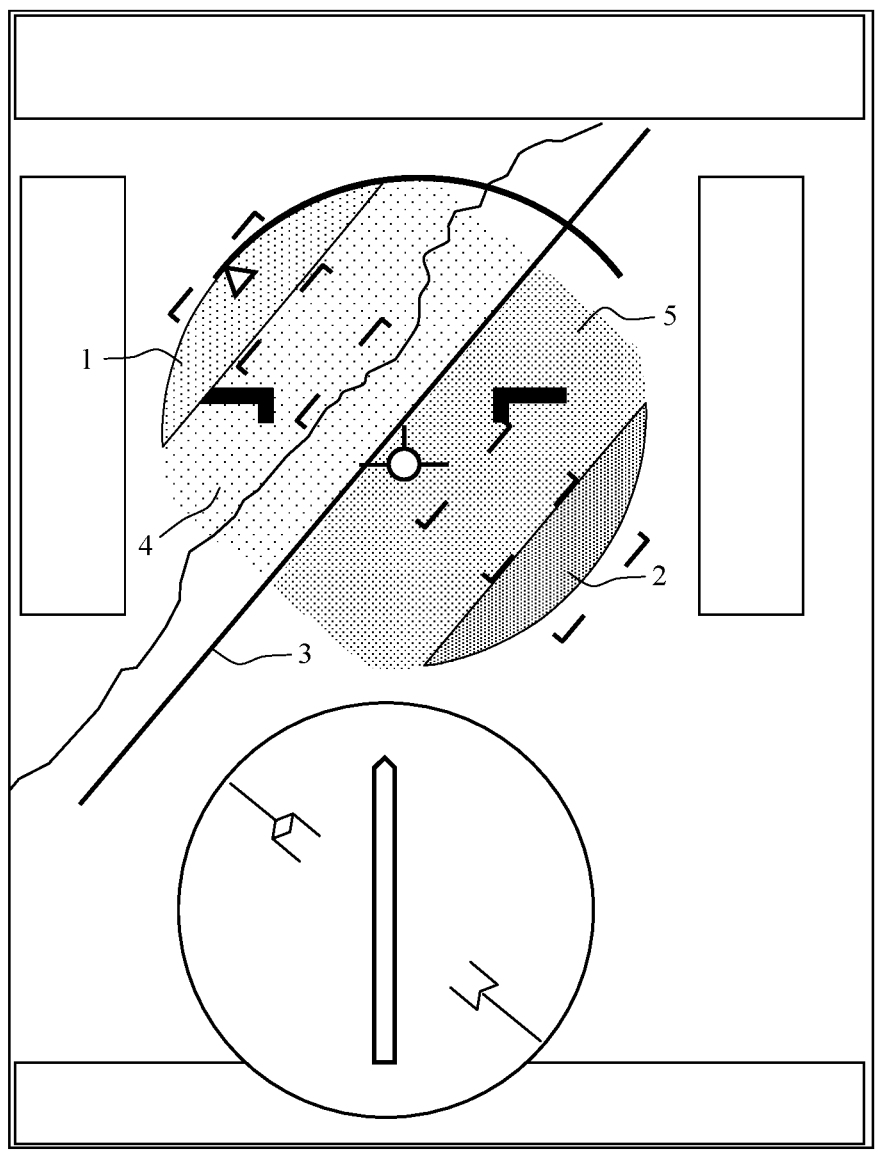
FIG. 4 represents a third representation of a PFD screen according to the invention.
Figure 5:
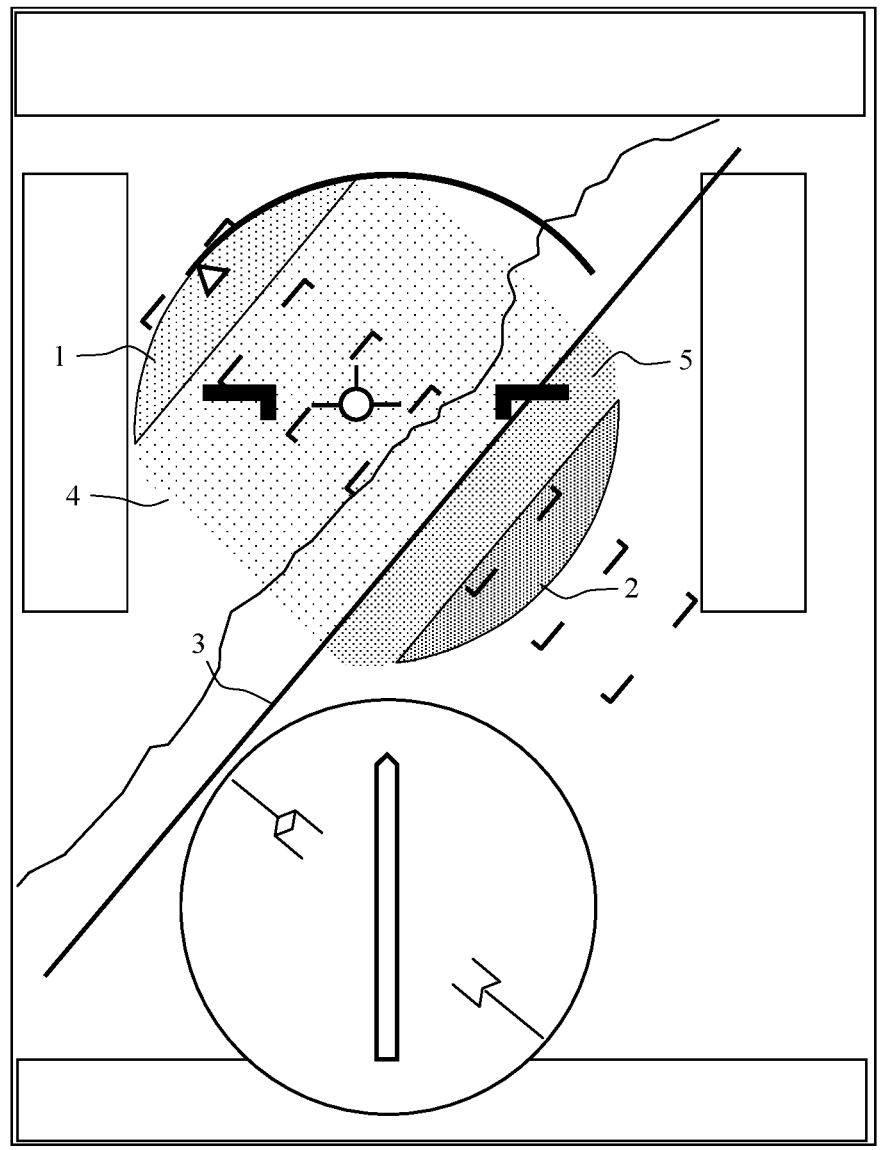
FIG. 5 represents a fourth representation of a PFD screen according to the invention.
Figure 6:
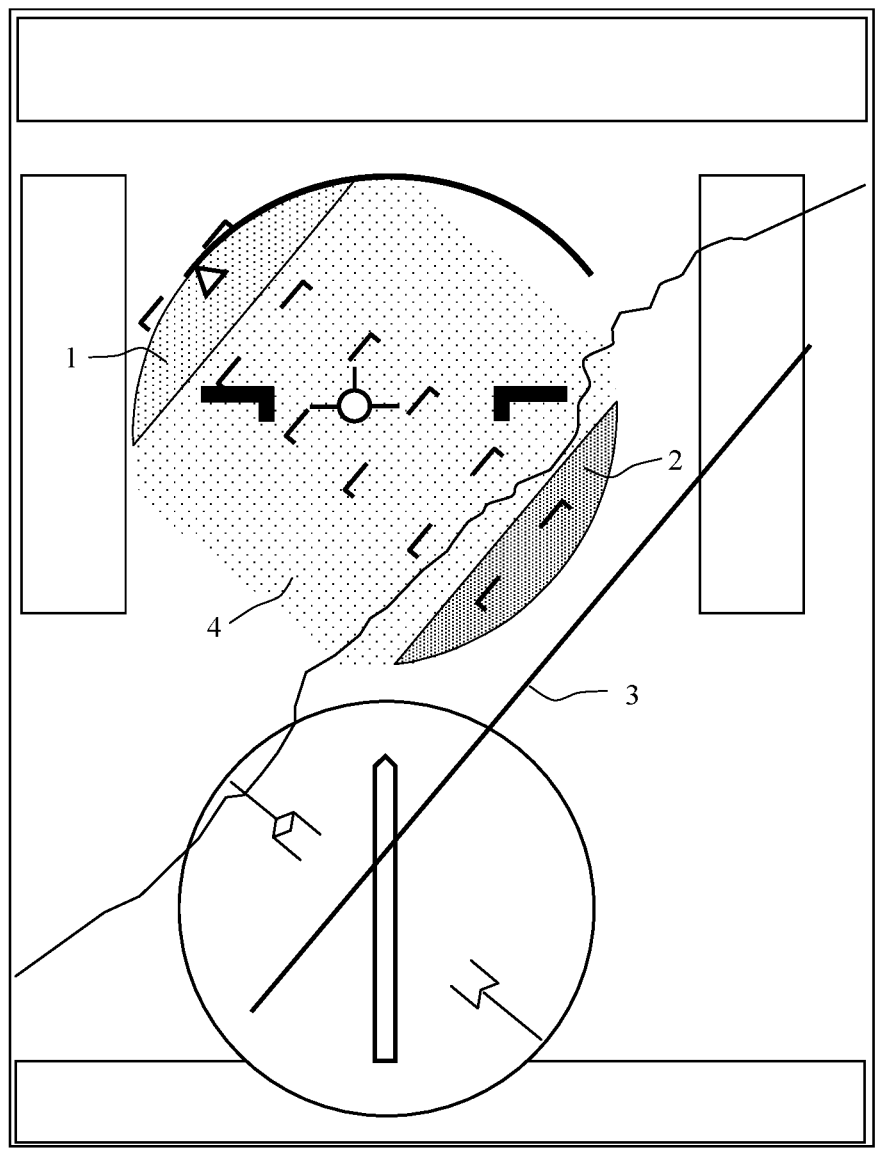
FIG. 6 represents a fifth representation of a PFD screen according to the invention.

This last configuration is represented in FIGS. 4, 5 and 6. The sky/earth areas are denoted 4 and 5 in these three figures. The line representing the zero longitudinal trim indicator, the indicator called ZPRL, is denoted 3. This line delimits the boundary between the two areas. These areas are of a colour that is identical or close to that of the disc segment with which they are associated which are the sky or the earth. To give orders of magnitude, the second mode appears if the roll is outside of a second range lying between −50 degrees and +50 degrees and/or the pitch is outside of a second range lying between −25 degrees and +25 degrees. Like the preceding values, these values depend on the type of aircraft and on the flight conditions imposed by the aircraft constructor.

In FIG. 4, the ZPRL runs at the centre of the two areas 4 and 5 which are of identical size. In FIG. 5, the ZPRL is close to the disc segment 2. The area 4 is larger than the area 5. In FIG. 6, the ZPRL is outside of the space situated between the disc segments 1 and 2. In the latter case, the area 4 occupies all the space situated between the two disc segments. The area 5 is no longer represented.

Advantageously, the appearance and the disappearance of the unusual attitude representation modes are managed by a hysteresis function so as to avoid untimely changes of mode. The threshold values on these hysteresis functions depend also on the type of carrier and on the choices of the aircraft constructor.

What is claimed is:
1. A method comprising:
   displaying a graphic representation on a display screen of an onboard display system for an aircraft, wherein:
   in an aircraft attitude that is not unusual, the graphic representation consists of piloting and navigation information superimposed on a three-dimensional synthetic representation of the outside landscape or on a real image of the outside landscape; and
   in an unusual aircraft attitude, the graphic representation consists of:
      piloting and navigation information superimposed on a three-dimensional synthetic representation of the outside landscape or on a real image of the outside landscape, and
      symbols showing the relative positions of sky and earth, the symbols comprising two elongate forms, one representing the sky and the other representing the earth, the rotation of the two elongate forms being slaved to the rotation of a line representing the zero longitudinal trim indicator;

wherein an unusual aircraft attitude corresponds to a roll value or to a pitch value located outside a first range of nominal values.

2. The graphic representation method according to claim 1, wherein the graphic representation in an unusual aircraft attitude comprises at least two different representation modes, a first representation mode corresponding to roll or pitch values located outside of a first range of nominal values, and a second representation mode corresponding to roll or pitch values located outside of a second range of values, higher than the first range of nominal values.

3. The graphic representation method according to claim 2, wherein the first representation mode comprises two identical elongate forms, that are opaque and of different colour, situated symmetrically on a circle concentric with the circle bearing the roll scale.

4. The graphic representation method according to claim 3, wherein in the first representation mode the two elongate forms comprise two disc segments of identical form, that are opaque and of different colour, each disc segment being limited by a circular arc and a straight-line segment joining the ends of said circular arc, the two disc segments being situated symmetrically on a circle concentric with the circle bearing the roll scale, the straight-line segments of the two disc segments being parallel to the line representing the zero longitudinal trim indicator.

5. The graphic representation method according to claim 4, wherein the width of the disc segment lies between 15% and 25% of the length of the straight-line segment.

6. The graphic representation method according to claim 4, wherein the second representation mode comprises the two preceding disc segments and two areas of identical form that are semi-transparent and of different colours, the two areas being situated symmetrically relative to the line representing the zero longitudinal trim indicator on a circle concentric to that bearing the roll scale, the first area extending between the straight-line segment of the first disc segment and the line representing the zero longitudinal trim indicator, without ever leaving the area defined by the straight-line segments of the first and of the second disc segments, the second area extending between the straight-line segment of the second disc segment and the line representing the zero longitudinal trim indicator, without ever leaving the area defined by the straight-line segments of the first and of the second disc segments.

7. The graphic representation method according to claim 1, wherein, when the roll value is located outside of a third range of values, lower than the first range of nominal values, the roll scale is widened, continually or discretely, so as to increase with the roll value.

8. The graphic representation method according to claim 2, wherein the first range of roll values lies between −45 degrees and +45 degrees, the second range of roll values lies between −50 degrees and +50 degrees, the first range of pitch values lies between −12.5 degrees and +15 degrees, the second range of pitch values lies between −25 degrees and +25 degrees.

9. The graphic representation method according to claim 2, wherein the display device comprises a function to avoid untimely changes from the first representation mode to the second representation mode and vice versa.

10. The graphic representation method according to claim 1, wherein the display device comprises a real image of the outside landscape superimposed on the synthetic view of the outside landscape.

11. The graphic representation method according to claim 1, wherein the display device is one of the aircraft instrument panel screens.

12. The graphic representation method according to claim 1, wherein the display device is a so-called "head up" display device comprising an optical element superimposing the synthetic image, the real image, or both the synthetic image and the real image, on the outside landscape.

* * * * *